United States Patent [19]
Abate

[11] 3,760,210
[45] Sept. 18, 1973

[54] MOUNTING ARRANGEMENT FOR AN ANGULAR SPEED OR POSITION SENSING DEVICE FOR A VEHICLE WHEEL

[75] Inventor: Galileo Abate, Turin, Italy

[73] Assignee: Fiat Societa per Azioni, Turin, Italy

[22] Filed: Sept. 20, 1971

[21] Appl. No.: 181,901

[30] Foreign Application Priority Data
Oct. 16, 1970 Italy .......................... 70447 A/70

[52] U.S. Cl. .................................. 310/168, 310/67
[51] Int. Cl. ..................................... H02k 19/20
[58] Field of Search ...................... 310/168, 90, 67, 310/67 D, 18, 156

[56] References Cited
UNITED STATES PATENTS
| | | | |
|---|---|---|---|
| 3,600,617 | 8/1971 | Frayer | 310/156 |
| 3,626,226 | 12/1971 | Pauwels et al. | 310/168 |
| 3,604,962 | 9/1971 | Larson et al. | 310/67 |
| 3,500,091 | 3/1970 | Jones | 310/168 |
| 3,596,122 | 7/1971 | Stewart | 310/67 |
| 3,626,227 | 12/1971 | Ritsema | 310/168 |

*Primary Examiner*—D. F. Duggan
*Attorney*—Sughrue, Rothwell, Mion, Zinn & Macpeak

[57] ABSTRACT

An angular speed sensing device for use in an anti-skid braking system has a magnetic sensor carried by a single support and cooperating with a tone wheel which is rotatably coupled to a wheel bearing cap, the sensor having electrical output leads connected to a plug carried by the support. The mounting arrangement permits bench-assembly of the device, and avoids overheating due to proximity to the brakes.

2 Claims, 3 Drawing Figures

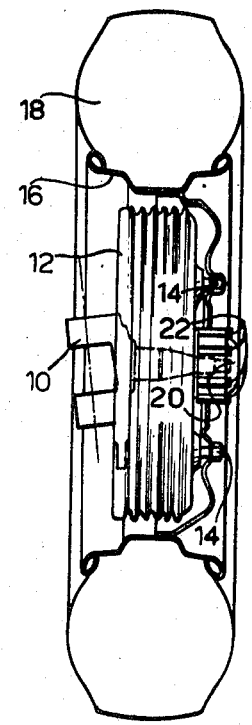
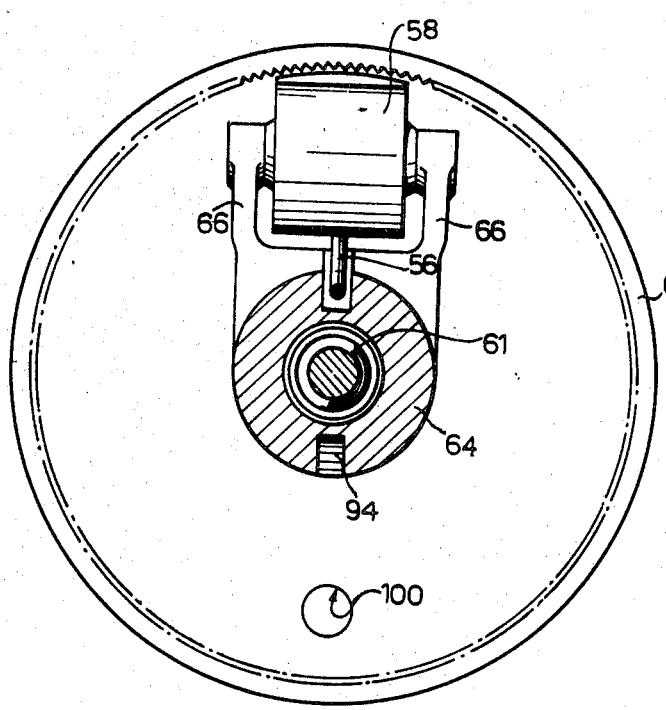

3,760,210

MOUNTING ARRANGEMENT FOR AN ANGULAR SPEED OR POSITION SENSING DEVICE FOR A VEHICLE WHEEL

BACKGROUND AND OBJECTS OF THE INVENTION

This invention relates to the mounting of an angular speed or position sensing device for a vehicle wheel, particularly but not exclusively for use in anti-skid braking systems. In particular this invention relates to the mounting of a speed sensing device for non-driving wheels of a vehicle, particularly on a front axle of the vehicle.

Such sensing devices have hitherto been mounted in close association with the wheel itself, usually in proximity to the brakes. This gave rise to undue heating of the device, because of the high temperatures which can be reached in proximity to the brakes in operation of a vehicle. This heating could compromise the precision of the device and might even prevent its correct operation.

Moreover, the mounting arrangements used until now for speed sensing devices required that the device should be fitted to a support in situ and connected electrically with the associated circuits such operations are sometimes time-consuming and difficult.

Lastly, the positioning of the speed sensing device in places to which access is difficult made maintenance and repair difficult.

A main object of this invention is to provide a mounting arrangement for speed or angular position sensing devices, particularly for anti-skid braking systems, in which the tendency to overheating of the sensing device due in particular to heat generated by the brakes in operation thereof, is reduced.

A further object of the invention consists in providing a mounting arrangement of the above mentioned type, in which the speed sensing device can be fitted to its support on the bench or at a factory rather than in situ, making the mounting operation on the vehicle easier and speedier.

Another object of this invention consists in providing a mounting arrangement of the above mentioned type by means of which the speed sensing device is readily accessible for maintenance and repair when it has been mounted on the vehicle.

More specifically, it is an object of the invention to provide a mounting arrangement for an angular speed or position sensing device assembly for a vehicle wheel, particularly for use in anti-skid braking systems, of the type including a magnetic sensor cooperating with a tone wheel, in which a single support adapted to be secured to the outer end of a support shaft carries the magnetic sensor and rotatably supports the tone wheel, the latter being rotatably coupled to a wheel bearing cap for rotation with the wheel, the electrical output leads of the magnetic sensor being connected to a connector for connection to an associated circuit upon mounting of the assembly.

BRIEF DESCRIPTION OF THE DRAWINGS

A preferred embodiment of the invention will be described, by way of non-limiting example, with reference to the accompanying drawings, in which:

FIG. 1 is a diagrammatic axial section of a front wheel of a motor vehicle, with an associated support shaft;

FIG. 3 is a transverse cross sectional view along the line III — III of FIG. 2.

DESCRIPTION OF THE ILLUSTRATED EMBODIMENT

Figure 2:
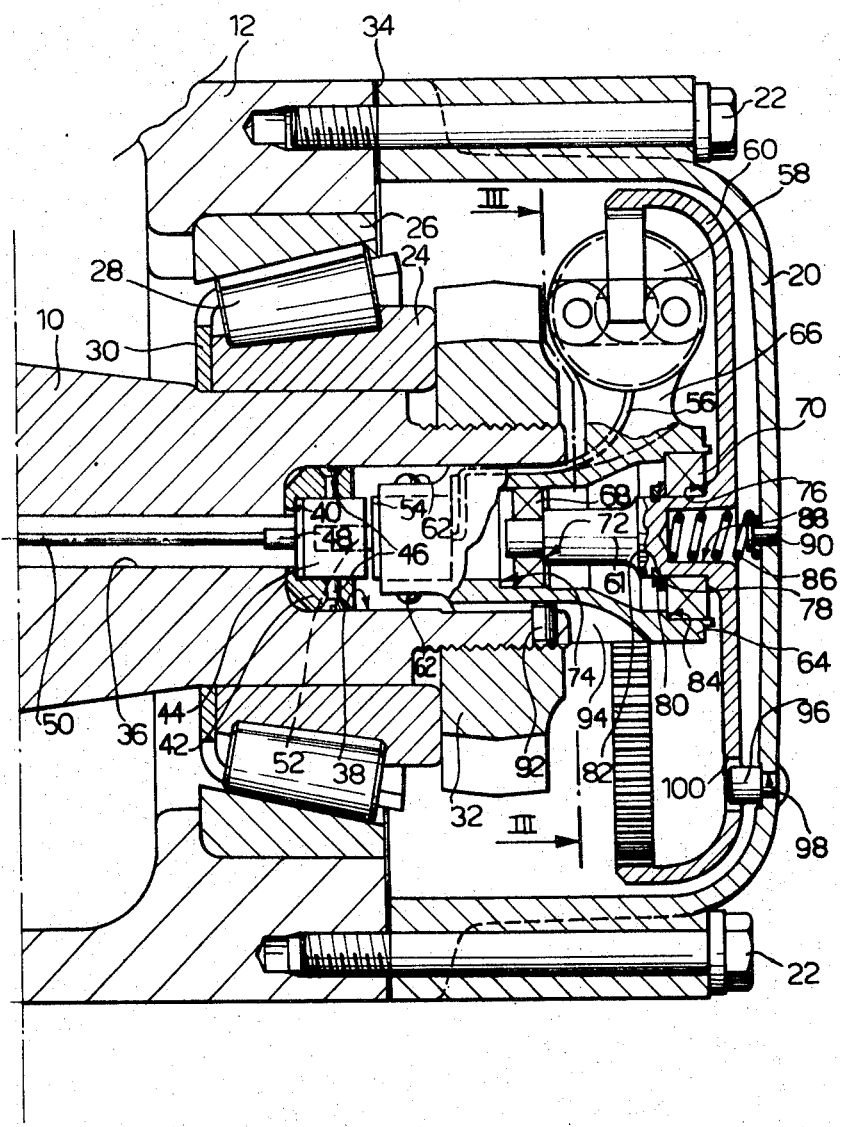
FIG. 2 is an axial section, on a relatively larger scale, of part of the support shaft and of the brake-drum of the wheel shown in FIG. 1, including a speed sensing device mounting arrangement according to the invention

With reference to FIG. 1, a non-rotating spindle 10 for a front wheel of a motor vehicle carries, by means of bearings (not shown) a brake drum 12. The brake drum 12 supports, by means of bolts 14, a wheel comprising a rim 16 and a pneumatic tyre 18. The outer end of the spindle 10 is protected by a cap 20 secured to the brake drum 12 by means of bolts 22.

As illustrated in more detail in FIG. 2 the brake drum 12 is mounted on the spindle 10 by means of a taper roller bearing having an inner ring 24, and an outer ring 26, between which frusto-conical rollers 28 are rotatably mounted and retained by a cage 30. A second bearing, not shown, is also provided inwardly of the bearing 24, 26, 28. A collar 32 is threaded on the outer end of the spindle 10 and secures the inner ring 24 of the bearing in position.

The cap 20 is fixed to the drum 12 by bolts 22 with the interposition of a packing 34 and protects the outer end of the spindle 10, the taper roller bearing, and a magnetic speed sensing device, described hereinafter.

The spindle 10 has an axial through bore 36 which has an enlarged diameter outer end forming a cylindrical seat 38. A block 42 rests against an annular shoulder 40 formed between the bore 36 and the cylindrical seat 38. The block 42 has a central seat in which an electrical socket connector 44 is secured by means of screws 46. The sprocket 44 has a connector ferrule 48 projecting into the bore 36 and connected to an electric cable 50 which passes through the bore 36 to a further connector (not shown) at the opposite end of the shaft 10, for connection to a control circuit (not shown) forming part of an anti-skid braking system. The block 42 is fixed in position in the cylindrical seat 38 against the shoulder 40 by a fixing screw (not shown) screwed into a radial drilling (not shown) in the shaft 10.

The socket connector 44, which may be of any suitable type, receives the pins 52 (shown in broken lines) of an electrical plug 54 connected to a lead 56 leading from a magnetic sensor 58 cooperating with a tone wheel 60. The magnetic sensor 58 generates a signal, proportional to the speed of the wheel 60, which is transmitted through the leads 56 and 50 to suitable signal processing circuits (not shown). The magnetic sensor 58 can be of any suitable type, and may for example be of the kind described in a co-pending U.S. patent application filed the July 22, 1971 Ser.No. 165,227 of the Applicants, entitled: "Magnetic detector for angular speed and position indicator".

The plug 54 is secured by screws 62 in the interior axial chamber of a hollow support 64 which carries the sensor 58 on two brackets 66 (see FIG. 3). The tone wheel 60 has a central stub shaft 61 which is supported through bearings 68, 70 within the hollow support 64. The bearing 68 is located axially between a shoulder 72 on the shaft 61 and a shoulder 74 in the interior chamber of the support 64. The bearing 70 is located on the stub shaft 61 of the tone wheel 60 between a shoulder 76 of the shaft 61 and a ring 78 kept in position by a circlip 80 seated in a groove 82 in the shaft 61, the bearing 70 resting against a second shoulder 84 in the interior chamber of the support 64.

The whole assembly formed by the support 64, the brackets 66, the magnetic sensor 58, the plug 54 and the shaft 61 of the tone wheel 60, is fitted in position in the cylindrical seat 38 of the spindle 10, with the pins 52 of the plug 54 engaged in the socket 44, and is pressed against the bottom of the seat 38 by a compression spring 86 bearing against the bottom of an axial seat 88 in the tone wheel 60 and secured to the cap 20 by a rivet 90. The support 64, and therefore the sensor 58, is fast with the spindle 10, being secured thereto by a stud 92 passing through a radial hole in the spindle 10 and engaged in a longitudinal groove 94 (FIG. 3) in the support 64. The tone wheel 60 is rotatable with the cap 20, and, therefore, with the brake drum 12, by means of a pin 96 riveted in a hole 98 in the cap 20, and located with some play in a hole 100 in the tone wheel 60.

The mounting and dismounting of the speed indicator assembly are therefore easily effected. The assembly also affords immediate access for maintenance and repair operations simply by unscrewing the bolts 22 and removing the cap 20, it being unnecessary separately to dismount the tone wheel 60 from the brake drum 12, or to dismount the brake drum itself, in contrast to similar previously known assemblies. The position of the sensor assembly according to the invention is particularly favourable from the operational point of view, because the speed sensor is well spaced from the wheel brakes, which generate heat in use of the vehicle.

What is claimed is:

1. A mounting arrangement for an angular speed or position sensing assembly for a vehicle wheel, particularly for use in anti-skid braking sytems, of the type including a magnetic sensor cooperating with a tone wheel, and a bearing cap rotatable with the vehicle wheel wherein the improvement comprises a single support, adapted to be secured to the outer end of a wheel spindle, carrying said magnetic sensor and rotatably supporting said tone wheel, means keying support on the outer end of said spindle, said support being positioned axially on said outer end, means rotatably coupling said tone wheel to said wheel bearing cap for rotation with the wheel, a spring carried by said cap for urging said tone wheel and said support against said connector and an electrical connector connected to the magnetic sensor and adapted to be connected to an associated circuit upon mounting of the assembly.

2. A mounting arrangement for an annular speed or position sensing assembly for a vehicle wheel, particularly for use in anti-skid braking systems, of the type including a magnetic sensor cooperating with a tone wheel, and a bearing shaft rotatable with the vehicle wheel wherein the improvement comprises a single support, adapted to be secured to the outer end of a wheel spindle, carrying said magnetic sensor and rotatably supporting said tone wheel, means rotatably coupling said tone wheel to the wheel bearing cap for rotation with the wheel, said means including a pin carried by said bearing cap and engaged with play in a hole in said tone wheel, and an electrical connector connected to the magnetic sensor and adapted to be connected to an associated circuit upon mounting of the assembly.

* * * * *